Oct. 20, 1959 G. HANSEN 2,909,099
MEANS FOR GUIDING AND SUPPORTING MEMBERS REQUIRING
PRECISION MOVEMENT, PARTICULARLY
MICROSCOPE TABLES
Filed Jan. 31, 1957 2 Sheets-Sheet 1
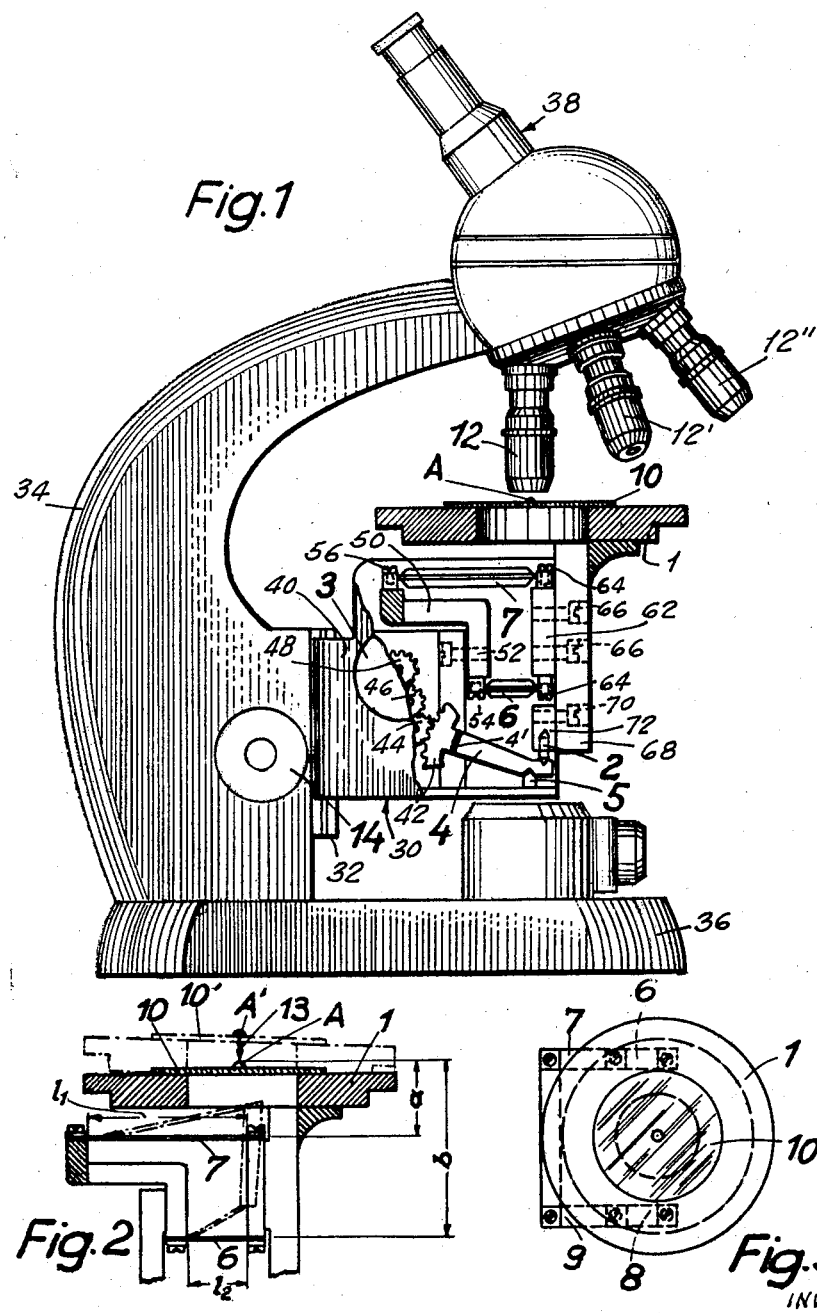
INVENTOR
GERHARD HANSEN
BY
Singer Stern & Carlberg United States Patent Office 2,909,099
Patented Oct. 20, 1959

2,909,099
MEANS FOR GUIDING AND SUPPORTING MEMBERS REQUIRING PRECISION MOVEMENT, PARTICULARLY MICROSCOPE TABLES

Gerhard Hansen, Heidenheim (Brenz), Wurttemberg, Germany, assignor to Carl Zeiss, Oberkochen, Wurttemberg, Germany Application January 31, 1957, Serial No. 637,580

Claims priority, application Germany February 1, 1956

6 Claims. (Cl. 88—39)

This invention relates to means for guiding and supporting members requiring precision movement, particularly microscope tables.

Parallel motion structures for guiding and supporting movable members are known in which two parallel links or levers are connected, on one hand, with the members to be moved and, on the other hand, with a stationary support. Such structures have the disadvantage that the movable member does not move on a straight line but rather the movement has a transverse component as the connection points between the movable member and the links follow arcuate paths around the connection points between the links and the stationary support. Frequently this is a great disadvantage as, for example, when the movable member is a microscope table since in such a case the object may move transversely out of the field of view when the table height is changed.

It is an object of the present invention to eliminate said disadvantage.

Another object of the invention is to provide a guide and support structure of the type indicated in which the links, or levers, are of different length.

Still another object of the invention is to provide a guide and support structure of the type indicated in which the lengths of the links are so inter-related that a point on the movable member, such as the point situated on the optical axis of a microscope, moves on a straight line, viz. the optical axis of the microscope, during the fine adjustment of the table level.

A further object of the invention is to provide a guide and support structure of the type indicated in which the links, or levers, comprise blade springs. This has the advantage of practically eliminating play which is particularly advantageous when the structure serves for the fine adjustment of the table level in a microscope. Previously, the mechanisms most commonly used in this connection have been greased swallow tail guides or ball bearing arrangements. The former could not be made entirely without play due to friction and the latter did not prove satisfactory, partly due to sensitiveness to impact.

Another object of the invention is to provide a guide and support structure of the type indicated in which the lengths of the links satisfy the following equation:

$$l_2 = l_1 \cdot \frac{a}{b}\left(1 - c \cdot \frac{(b-a)L^2}{4a^2 l_1 b}\right)$$

wherein $l_1$ is the length of one of the links,
$l_2$ is the length of the other link,
$a$ is the distance between the connection point of the first mentioned link to the movable member and the point whose movements are to be controlled (for example, the point of intersection between the optical axis and the table top of a microscope) measured when the movable member is in its middle position,
$b$ is the corresponding distance for said other link,
$L$ is the maximum distance of movement of the point whose movements are to be controlled in either direction from said middle position of the movable member, and
$c$ is the distance between a line through the connection points of the links to the movable member and a line (for example, the optical axis of a microscope) parallel thereto through said point whose movements are concerned.

It will be noted in this equation that when $c=0$, that is, when the point whose movements are to be controlled and the two connection points between the links and the movable member are disposed on one and the same straight line, then the equation takes the form $$l_2 = l_1 \cdot \frac{a}{b}$$

or, in other words, the proportion between the lengths of the links is the inverse of the proportion between the respective distances of the link connection points to the movable member and the said point whose movements are to be controlled.

Accordingly, still another object of the invention is to provide a guide and support structure of the type indicated in a microscope in which the links are parallel with each other in the middle adjustment position of the microscope table and in which the proportion between the lengths of the links is the inverse of the proportion between the respective distances between the object plane of the microscope and the connection points of the links to the table. In this case, the microscope table will assume a slightly inclined position in relation to the optical axis of the microscope when the table is moved away from its aforementioned middle position. However, within the practically used adjustment range this inclination is so insignificant as to be of no importance compared to the advantage of movement along the optical axis of the microscope.

A further object of the invention is to provide a guide and support structure of the type indicated in which at least two such structure units are employed in order to ensure stability regardless of whether the drive mechanism for the movable member actuates said member symmetrically or not.

The invention is described in detail below with reference to the accompanying drawings, in which:

Fig. 1 shows a side elevation, partly in section, of a microscope provided with a table guide and support mechanism according to the invention;

Fig. 2 is a partial view of the same microscope, also in elevation and partial section;

Fig. 3 shows a plan view of the structure of Fig. 2; and

Figure 4:
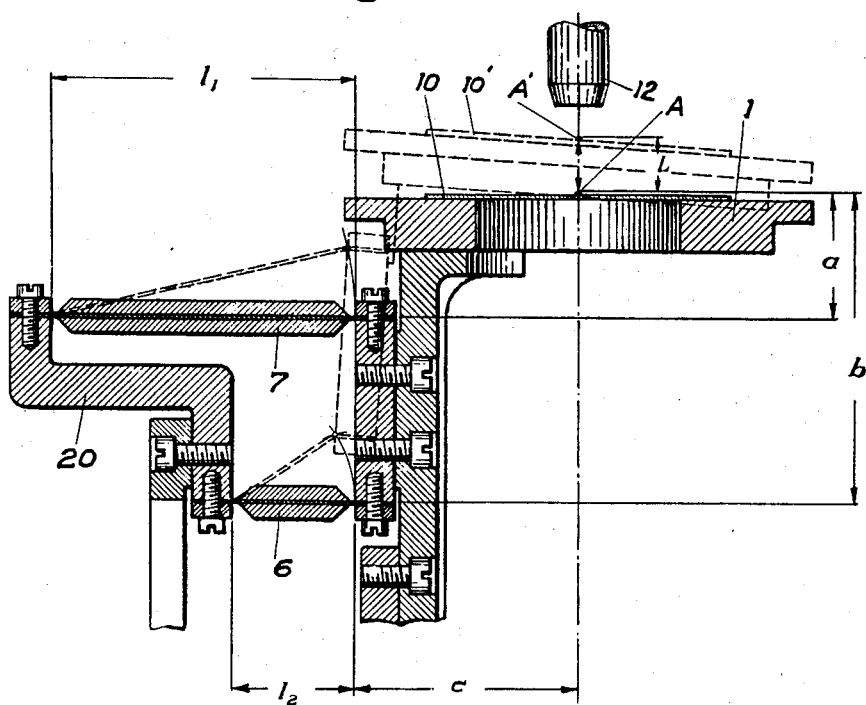
Fig. 4 shows a modified embodiment of the invention in vertical section.

In the embodiment of Figs. 1–3, the inventive guide and support structure 30 for the microscope table 1 is mounted on vertical guideways 32 provided on a microscope frame 34 which has a base 36 and carries an optical assembly 38 which is of conventional design, in this case having three selectively useable objective assemblies 12, 12', 12". The guide and support structure 30 is slidable on the guideways 32 through conventional means (not shown) by turning of a knob 14 for coarse, or approximate, adjustment of the table level.

The guide and support structure 30 for fine, or precision, adjustment of the table level comprises a support member 40 to which an upwardly facing knife edge 5 is secured for rockable support of a lever 4 provided on one arm with a gear segment 42 in engagement with a gear wheel 44 that is rotatably mounted on the support member 40. Through the intermediary of another gear wheel 46 similarily mounted in the support member 40 said gear wheel 44 is in operative engagement with a third gear wheel 48 secured to the shaft of a knob 3 for manual operation of the lever 4 on the knife edge 5 as a rocking center.

A member 50 is firmly secured to the support member 40 by means of screws 52 (only one shown in the drawing) and to said member 50 two pairs of links 6, 7 and 8, 9 are secured by means of screws 54, 56 and 58, 60, respectively. The other ends of said links are secured to blocks 62 by means of screws 64 and said blocks 62 are, in turn, firmly connected through screws 66 to members 68 extending downwardly from the table 1. Other screws 70 serve to secure blocks 72 to said downwardly extending members 68, each of said last mentioned blocks 72 being provided with a downwardly projecting knife edge 2 supported on the lever 4 at the end thereof disposed at the opposite side of the knife edge 5 from the gear segment 42. As indicated by the cross-hatched portion 4' of the lever 4, said lever is substantially U-shaped with one leg of the U-portion extending below each of the knife edges 2. The knife edge 5 supports both legs and may be continuous between them or it may comprise two separate aligned knife edge members. The links 6, 7, 8, 9 are blade springs sufficiently weak to yield under the weight of the table 1 and associated parts so as to ensure constant engagement between the knife edges 2 and the lever 4. In the middle position of height of the table, as shown in Fig. 1, the links are parallel and horizontal.

In operation, the object A to be examined in the microscope is placed on a plate 10 which rests on the table 1 and the proper objective assembly 12 is moved into position thereabove. The table 1 is then moved to approximately the correct level by means of the knob 14, all in the conventional manner. During this procedure, the links are preferably in their middle position, as indicated in Fig. 1 and also in full lines in Fig. 2. The precision adjustment of the table level is then accomplished by turning of the knob 3 and it is evident that turning of said knob 3 in a clockwise direction, as viewed in Fig. 1, will cause the table to be raised. It is also obvious that, since the arm of the lever 4 provided with the gear segment 42 is several times longer than the other lever arm, the table will be raised by a fraction only of the movement of the gear segment 42, thus permitting an extremely fine adjustment of the table level.

The raised position of the table 1 and associated parts is exaggeratedly indicated by broken lines in Fig. 2, the raised positions of the plate 10 and object A being marked 10' and A', respectively. Due to the difference in length between the springs 6 and 7 (and 8 and 9), said springs are no longer exactly parallel and it is obvious that said difference in length also causes the table 1 (and plate 10') to occupy a slightly inclined position in the raised condition. However, within the range of precision adjustment, any disadvantage of this slight inaccuracy is greatly outweighed by the fact that the movement of the object A to raised position follows a straight vertical line. For example, if the center of the object A was originally on the optical axis of the microscope, said center remains on said optical axis during the raising (and lowering) of the table by means of the precision adjustment mechanism.

In the embodiment of the invention described in detail above, the optical axis of the microscope intersects the horizontal lines connecting the hinge points between the blocks 62 and the springs 6, 7 and 8, 9, respectively, and accordingly, this is the case referred to above, where $$l_2 = l_1 \cdot \frac{a}{b}$$

the significance of the symbols employed in this equation being explained above and indicated in Fig. 2.

In the modified embodiment partially illustrated in Fig. 4, members corresponding to the members in Fig. 1 carry the same reference marks with the addition of an "m." It will be noted that, in this embodiment, the arrangement is such that the optical axis B of the microscope does not intersect the horizontal connection lines between the above mentioned hinge points, said connection lines being located at a distance $c$ from the optical axis, as explained above and indicated in the drawing. The distance L, defined above, is also indicated in Fig. 4 and, obviously, this embodiment represents a case to which the above equation $$l_2 = l_1 \cdot \frac{a}{b}\left(1 - c \cdot \frac{(b-a)L^2}{4a^2 l_1 b}\right)$$

applies.

Obviously, the two pairs of levers in the embodiments described above could be replaced by a single pair of springs centrally disposed and the purpose of the duplication is only to ensure greater stability in a lateral direction. Other modifications are feasible within the scope of the attached claims.

What I claim is:

1. In a guide and support structure for a movable member requiring precision adjustment, a support member, at least two link members of different length hingedly connecting said movable member to said support member, and means for moving said movable member on said hinge connections in relation to said support member, said moving means being adapted to permit movement of the movable member in two opposite directions from a middle position of the movable member in which said link members are parallel, and the projections of the hinge points between the links and the movable member on a plane parallel with said link members through a reference point on said movable member being disposed on a straight line through said reference point, the lengths $l_1$ and $l_2$ of said link members being determined by the equation $$l_2 = l_1 \cdot \frac{a}{b}$$

in which $a$ and $b$ are the distances of said hinge points of the links having the lengths $l_1$ and $l_2$, respectively, from a plane through said reference point perpendicular to said reference line.

2. A guide and support structure as set forth in claim 1, in which said movable member comprises the table in a microscope, said reference line is the optical axis of said microscope, and said reference point is a point of intersection between said optical axis and an object to be examined in the microscope and disposed on said microscope table.

3. In a guide and support structure for a movable member requiring precision adjustment, a support member, at least two link members of different length hingedly connecting said movable member to said support member, and means for moving said movable member on said hinge connections in relation to said support member, said moving means being adapted to permit movement of the movable member in two opposite directions from a middle position of the movable member in which said link members are parallel, and the projections of the hinge points between the links and the movable member on a plane parallel with said link members through a reference point on said movable member being disposed on a straight line parallel to a reference line in said plane through said reference point, the lengths $l_1$ and $l_2$ of said link members being determined by the equation $$l_2 = l_1 \cdot \frac{a}{b}\left(1 - c \cdot \frac{(b-a)L^2}{4a^2 l_1 b}\right)$$

in which $a$ and $b$ are the distances of said hinge points of the links having the lengths $l_1$ and $l_2$, respectively, from a plane through said reference point perpendicular to said reference line, $c$ is the distance of said straight line from said reference line, and L is the distance of maximum movement of said reference point on said reference line in one direction from said middle position of the movable member.

4. A guide and support structure as set forth in claim 3, in which said movable member comprises the table in a microscope, said reference line is the optical axis of said microscope, and said reference point is a point of insection between said optical axis and an object to be examined in the microscope and disposed on said microscope table.

5. A guide and support structure as set forth in claim 3, in which said link members comprise blade springs.

6. A guide and support structure as set forth in claim 3, in which said moving means comprises a lever pivotally supported on a fulcrum on said support member and having two arms of which one is several times longer than the other, the shorter arm supporting said movable member and the longer arm being connected with means for manually rocking said lever on said fulcrum in two opposite directions from said middle position of said movable member in which said link members are parallel.

References Cited in the file of this patent

UNITED STATES PATENTS

| | | |
|---|---|---|
| 182,919 | Gundlach | Oct. 3, 1876 |
| 1,141,279 | Smith | June 1, 1915 |
| 1,638,938 | Koeigkramer | Aug. 16, 1927 |
| 2,537,917 | Simmons | Jan. 9, 1951 |
| 2,705,438 | Peto | Apr. 5, 1955 |
| 2,780,135 | Chandler | Feb. 5, 1957 |